Feb. 7, 1950 E. P. BRUKHOLDER 2,496,982
CROP CUTTER

Filed Jan. 21, 1947 3 Sheets-Sheet 1

INVENTOR.
*Ezra P. Brukholder*

BY *Victor J. Evans & Co.*

ATTORNEYS

Feb. 7, 1950  E. P. BRUKHOLDER  2,496,982
CROP CUTTER

Filed Jan. 21, 1947  3 Sheets-Sheet 2

INVENTOR.
Ezra P. Brukholder
BY Victor J. Evans & Co.
ATTORNEYS

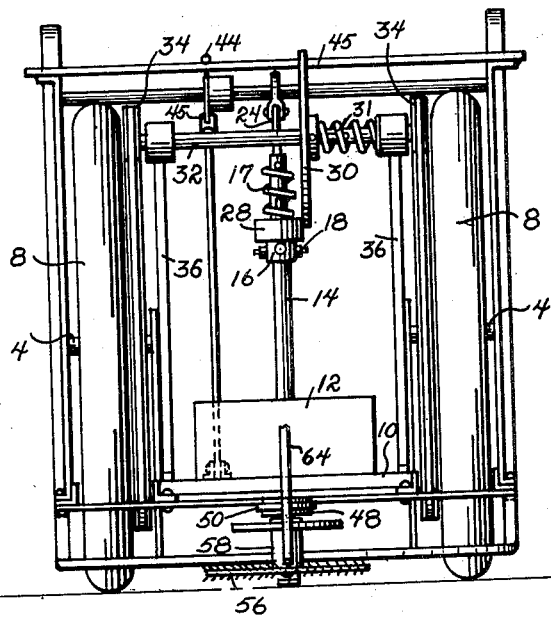

Patented Feb. 7, 1950

2,496,982

UNITED STATES PATENT OFFICE 2,496,982
CROP CUTTER

Ezra P. Brukholder, Ephrata, Pa.

Application January 21, 1947, Serial No. 723,377

1 Claim. (Cl. 56—53)

My present invention relates to an improved crop cutter and more particularly to a wheeled powered machine self-driven and carrying a rotary cutter disk especially suitable for cutting tobacco and truck crops.

In the accompanying drawings I have illustrated one complete example of the physical embodiment of my invention according to the best mode I have thus far devised, but it will be understood that various changes and alterations may be made in the exemplified structure within the scope of the appended claim.

In the drawings:

Fig. 3 is a rear elevational view.

Figure 1:
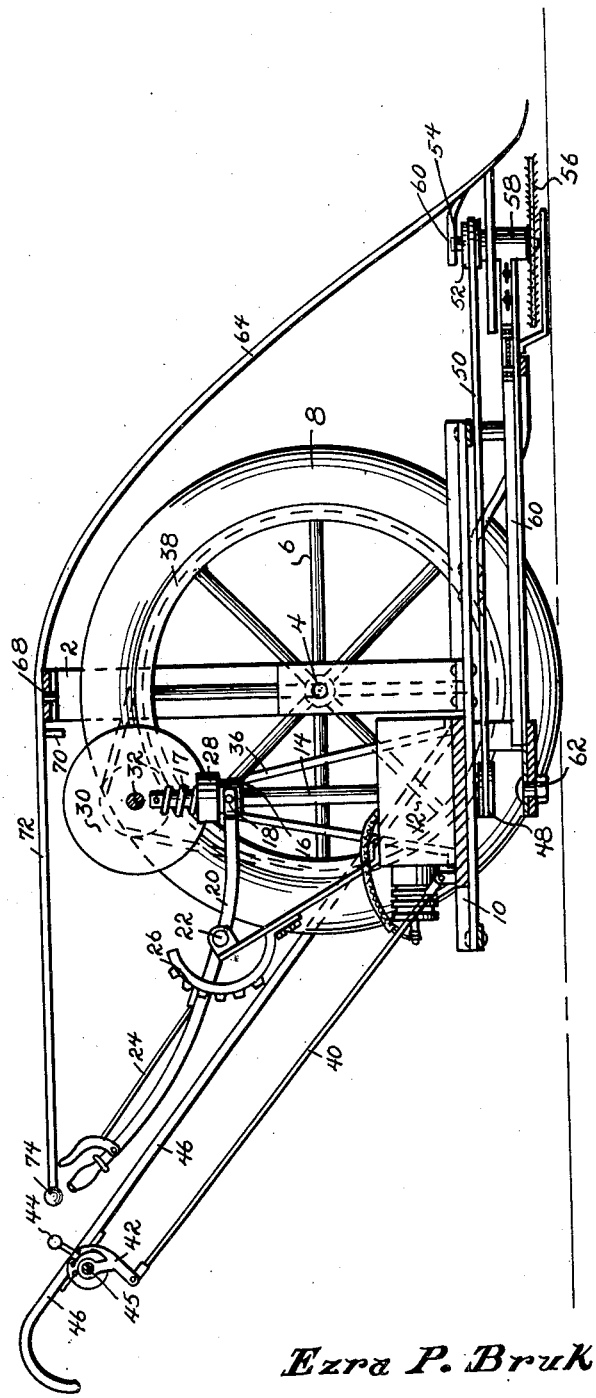
Fig. 1 is a longitudinal vertical sectional view of the cutter of my invention.

Referring now to the drawings, I employ a frame 2 in which are journaled the axles 4 for the wheels 6, having tires 8.

On the lower ends of the frame 2 I provide a platform 10 supporting gasoline engine 12 having a vertically disposed driven shaft 14.

On the upper end of the shaft I use a collar 16 slidable on the shaft against spring 17 through the fork 18 of lever 20 fulcrumed at 22 and formed with a spring pressed rod 24 the end of which is engageable with the notched rack 26.

A disk 28 on the collar is movable to functionally engage the clutch disk 30 pressed by spring 31 on shaft 32 and pulleys 34 on the shaft drive the wheels through belts 36 to the pulley rims 38 of the wheels. Motor speed is controlled through the link 40 and lever 42 by control handle 44 mounted on the shaft 45 in handle frame 46.

The lower end of shaft 14 has a pulley 48 driving belt 50 and pulley 52 on the vertical shaft 54 for the toothed cutting disk 56. The shaft 54 is journaled at 48 in the supporting frame 60 disposed and supported below the platform 10.

Figure 2:
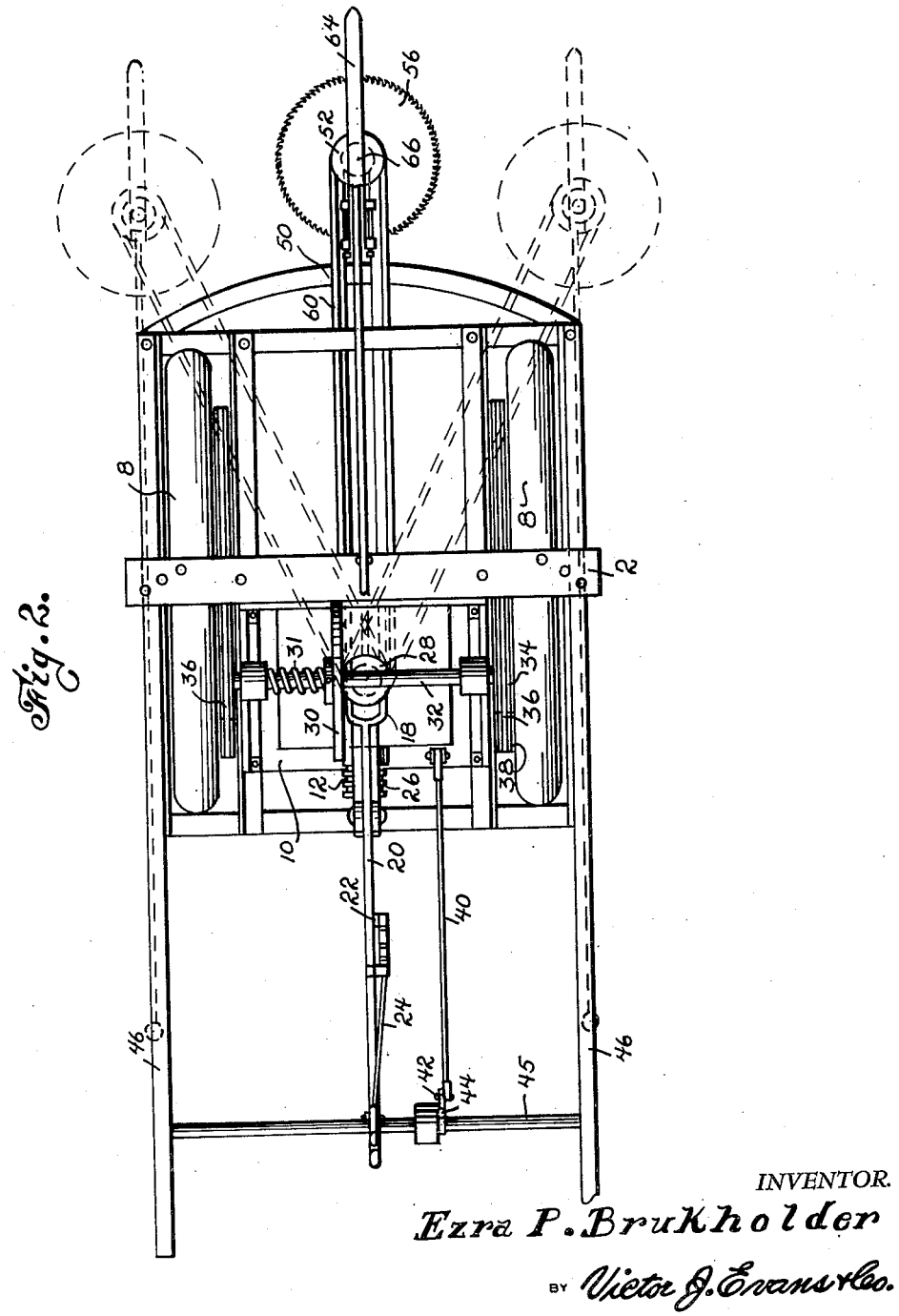
Fig. 2 is a top plan view.

The frame 60 is pivotally mounted at 62 so that the frame and cutter may be swung to the side as indicated in Fig. 2 by means of the rod 64 connected with the shaft 54 at 66 and journaled at 68 on the frame 2. A stop lug 70 limits the pivotal movement controlled through arm 72 having knob 74.

As the engine operates and revolves the shaft 14 the cutter will rotate in the frame 60 and the position of the frame and cutter may be set by the handle arm 72.

Movement of the lever 42 will effect movement of the disk 28 to engage disk 30 to drive the wheels.

The cutter of my invention will prove valuable in cutting such crops as tobacco or truck crops and will efficiently perform its function saving time and labor.

Having thus fully described my invention what I claim as new and desire to secure by Letters Patent is:

In a crop cutter having a U-shaped wheeled frame, a platform carried by and within the frame centrally thereof and a motor having a vertically disposed shaft mounted on the frame, the improvement comprising a cutter disk operatably connected to the said shaft, a supporting frame for the cutter disk pivotally mounted on said platform, manual means for swinging said frame, movement limiting means on said manual means, said manual means being pivoted at the upper end of the frame at its central portion and to the supporting frame at its forward end, and power transmitting means between the shaft and the wheels on the frame.

EZRA P. BRUKHOLDER.

REFERENCES CITED

The following references are of record in the file of this patent:

UNITED STATES PATENTS

| Number | Name | Date |
|---|---|---|
| 897,436 | Watkins | Sept. 1, 1908 |
| 1,830,871 | Domagala | Nov. 10, 1931 |
| 1,850,326 | Kelly | Mar. 22, 1932 |
| 1,891,526 | Dupuis | Dec. 20, 1932 |
| 2,076,056 | Woodford | Apr. 6, 1937 |

FOREIGN PATENTS

| Number | Country | Date |
|---|---|---|
| 391,967 | Great Britain | May 11, 1933 |
| 498,393 | Great Britain | Jan. 6, 1939 |